United States Patent
Peroulas (10) Patent No.: US 10,075,778 B2
(45) Date of Patent: Sep. 11, 2018

(54) BASE STATION WITH BASEBAND BYPASS

(71) Applicant: Google LLC, Mountain View, CA (US)

(72) Inventor: James Peroulas, San Mateo, CA (US)

(73) Assignee: Google LLC, Mountain View, CA (US)

( * ) Notice: Subject to any disclaimer, the term of this patent is extended or adjusted under 35 U.S.C. 154(b) by 85 days.

(21) Appl. No.: 15/228,668

(22) Filed: Aug. 4, 2016

(65) Prior Publication Data

US 2018/0041822 A1    Feb. 8, 2018

(51) Int. Cl.
| | |
|---|---|
| *G01R 31/08* | (2006.01) |
| *H04B 7/00* | (2006.01) |
| *H04L 12/28* | (2006.01) |
| *H04J 3/00* | (2006.01) |
| *H04Q 3/66* | (2006.01) |
| *H04W 72/12* | (2009.01) |
| *H04W 88/08* | (2009.01) |

(52) U.S. Cl.
CPC .......... *H04Q 3/66* (2013.01); *H04W 72/1268* (2013.01); *H04W 88/08* (2013.01)

(58) Field of Classification Search
CPC .. H04Q 3/66; H04Q 11/0478; H04L 12/4641; H04L 12/4608
See application file for complete search history.

(56) References Cited

U.S. PATENT DOCUMENTS

| | | | |
|---|---|---|---|
| 8,489,089 B1 * | 7/2013 | Norman ................ | H04W 24/00 455/424 |
| 9,125,047 B2 | 9/2015 | Sundaresan et al. | |
| 2006/0268929 A1 * | 11/2006 | Lai .......................... | H04L 1/005 370/465 |

(Continued)

FOREIGN PATENT DOCUMENTS

| | | |
|---|---|---|
| EP | 1534027 A2 | 5/2005 |
| EP | 2753143 A1 | 7/2014 |
| WO | 2013072108 A1 | 5/2013 |

OTHER PUBLICATIONS

"Open Radio Equipment Interface", ETSI, retrieved from the internet May 9, 2016, Sophia Antipolis, France, 2 pages.

(Continued)

*Primary Examiner* — Brian Roberts
*Assistant Examiner* — Abu-Sayeed Haque
(74) *Attorney, Agent, or Firm* — Lerner, David, Littenberg, Krumholz & Mentlik, LLP (57) ABSTRACT

An integrated base station provides uplink and downlink wireless connectivity between user equipment and a wireless communication network. In order to accommodate certain features of the network, a bypass switch of the integrated base station is employed so that the baseband module of the base station is bypassed as to those features. In this case, selected data obtained from the RF transceiver of the integrated base station is processed by equipment in the back end system instead of by the baseband module. A first operation mode enables the baseband module to process the selected data, while a second operation mode bypasses the baseband module so that the back end system performs the processing. The bypass switch may be permanently activated. The bypass process allows for processing of the selected data in an efficient manner without requiring replacement of the integrated base station, thereby providing an efficient and cost-effective solution.

20 Claims, 6 Drawing Sheets

(56) References Cited

U.S. PATENT DOCUMENTS

| | | | | |
|---|---|---|---|---|
| 2006/0270369 | A1* | 11/2006 | Hahm | H03M 13/2975 455/130 |
| 2010/0157786 | A1* | 6/2010 | Akita | H04L 5/023 370/210 |
| 2012/0176966 | A1* | 7/2012 | Ling | H04B 1/40 370/328 |
| 2012/0250740 | A1* | 10/2012 | Ling | H04W 88/085 375/219 |
| 2012/0309376 | A1* | 12/2012 | Huang | H04M 1/72572 455/418 |
| 2013/0136068 | A1 | 5/2013 | Johansson et al. | |
| 2014/0122553 | A1* | 5/2014 | Dehner | G06F 17/142 708/403 |
| 2014/0207836 | A1* | 7/2014 | Mundarath | G06F 7/026 708/201 |
| 2014/0349640 | A1 | 11/2014 | Fujita | |
| 2016/0277253 | A1* | 9/2016 | Uyehara | H04W 88/085 |
| 2017/0310437 | A1* | 10/2017 | Bottari | H04L 5/0032 |

OTHER PUBLICATIONS

"Smart RAN for 4G—Compact-BTS, Metro-Femto & ORI", Telecom Cloud, retrieved from the internet May 9, 2016, <http://www.telecom-cloud.net/smart-ran-for-4g-compact-bts-metro-fem . . . >, 4 pages.

"ZTE's BBU+RRU Solution", ZTE Corporation, Jun. 28, 2007, retrieved from the internet May 9, 2016, <http://wwwen.zte.com.cn/endata/magazine/ztetechnologies/2007year/no6 . . . >, 3 pages.

Data Sheet, "Nokia Solutions and Networks Flexi Lite Base Station", retrieved from the internet May 9, 2016, 2 pages.

Plante et al., "EE Times—Opening Base Station Architectures Part 1: An Inside Look at OBSAI", Oct. 19, 2004, retrieved from the internet May 9, 2016, http://www.eetimes.com/document.asp>,6 pages.

Plante et al., "Opening Base Station Architectures Part 2": An Inside Look at CPRI, Oct. 20, 2004, retrieved from the internet May 9, 2016, <http://www.eetimes.com/document.asp>, 5 pages.

Group Specification, ETSI GS ORI 001 v1.1.1 (Oct. 2011), Sophia Antipolis Cedex, France, 2011, retrieved from the internet May 9, 2016, 11 pages.

Namba S et al: "BBU-RRH switching schemes for centralized RAN", Communications and Networking in China (CHINACOM), 2012 7th International ICST Conference on, IEEE, Aug. 8, 2012 (Aug. 8, 2012), pp. 762-766, XP032425059, DOI: 10.1109/CHINACOM.2012.6417586, ISBN: 978-1-4673-2698-8.

International Search Report and Written Opinion for PCT Application No. PCT/US2017/044640 dated Nov. 7, 2017. 16 pages.

* cited by examiner

BASE STATION WITH BASEBAND BYPASS

BACKGROUND

All-in-one base stations are single unit configurations that contain baseband processing circuitry and power amplifier circuitry. The power amplifier circuitry may account for most of the cost and physical size of an all-in-one base station. In order to upgrade features such as baseband processing, these types of base stations are typically replaced completely even though the power amplifier circuitry and other components may be in perfectly good working order. The expense and time involved in a replacement like this can be prohibitive, adversely affecting the rollout of system improvements and ultimately raising costs for consumers.

BRIEF SUMMARY

Aspects of the technology involve providing enhancements for self-contained or all-in-one base stations without requiring wholesale replacement of the base stations or subsystems thereof.

One aspect of the disclosure provides an integrated base station, including a radio transceiver subsystem operative to communicate with one or more wireless devices in a wireless communication network. The radio transceiver subsystem may include one or more antennae and a power amplifier. The integrated base station further includes a baseband subsystem operatively coupled to the radio transceiver subsystem, the baseband subsystem configured to process uplink communication data and radio data received from the radio transceiver subsystem, to provide the processed uplink communication data to one or more baseband units of the wireless communication network, and to provide the processed radio data to the radio transceiver subsystem. Moreover, the integrated base station includes a transport module operatively coupled to the baseband subsystem and to the radio transceiver subsystem, the transport module configured to exchange selected data with the one or more baseband units, and a switch operatively coupled to the radio transceiver subsystem, the baseband subsystem and the transport module, the switch being configured to bypass processing of selected portions of the radio data by the baseband subsystem and to transmit the unprocessed selected radio data portions to the one or more baseband units for subsequent processing via the transport module. The switch may be arranged to bypass the processing by the baseband subsystem in response to a bypass decision received from the wireless communication network.

Another aspect of the disclosure provides a computer-implemented method for baseband bypass in an integrated base station of a wireless communication network. This method includes receiving, by one or more processors, notification of a feature modification in the wireless communication network, and determining, by one or more processors, whether the feature modification is supported by a baseband module of the integrated base station. Upon determining that the feature modification is not supported by the baseband module of the integrated base station, the method further includes activating a bypass switch in the integrated base station to route selected data from a radio transceiver subsystem of the base station to a back end system element of the wireless communication network for baseband processing of the selected data, and providing the baseband processed selected data to the radio transceiver subsystem via the bypass switch.

Yet another aspect of the disclosure provides a wireless network system including a back end system including one or more baseband units, and an integrated base station. The integrated base station includes a radio transceiver subsystem operative to communicate with one or more wireless devices in a wireless communication network. The radio transceiver subsystem includes one or more antennae, and a power amplifier. The system further includes a baseband subsystem operatively coupled to the radio transceiver subsystem, the baseband subsystem configured to process uplink communication data and radio data received from the radio transceiver subsystem, to provide the processed uplink communication data to one or more baseband units of the wireless communication network, and to provide the processed radio data to the radio transceiver subsystem. Moreover, the system includes a transport module operatively coupled to the baseband subsystem and to the radio transceiver subsystem, the transport module configured to exchange selected data with the one or more baseband units, and a switch operatively coupled to the radio transceiver subsystem, the baseband subsystem and the transport module, the switch being configured to bypass processing of selected portions of the radio data by the baseband subsystem and to transmit the unprocessed selected radio data portions to the one or more baseband units for subsequent processing via the transport module. One or more links operatively couple the integrated base station to the one or more baseband units.

BRIEF DESCRIPTION OF THE DRAWINGS

Accompanying this specification is a set of drawings illustrating various features and aspects of the technology. In the drawings, like reference numerals refer to like elements. A brief discussion of each drawing is provided below.

The following description is based on embodiments of the claims and should not be taken as limiting the claims with regard to alternative embodiments that are not explicitly described herein.

DETAILED DESCRIPTION

Overview

The technology relates to an all-in-one integrated base station that provides wireless connectivity between user equipment such as cell phones, laptops and netbooks with a wireless communication network. In order to be cost and resource efficient, when it is necessary or desired to enhance certain features of an all-in-one integrated base station, according to aspects of the technology the baseband section is bypassed so that selected data is instead processed by equipment in the back end of the wireless system. For instance, new or revised standards may require changes to how certain information is handled. Replacing or upgrading the baseband unit could be prohibitively expensive and time consuming, so it is desirable to implement an alternative way of accommodating the enhancements by switching the handling of selected data to other parts of the network.

Other elements of the base station, including the power amplifier, would not be changed out. This can be very efficient because the baseband unit is typically a smaller percentage of the cost of a base station than the power amplifier or other components. In turn, this means that a system upgrade can be completed more cheaply and quickly than a full-scale replacement, because it is unnecessary to replace the already rolled-out integrated base stations.

An all-in-one integrated base station according to aspects of the disclosure may employ either an optical fiber or copper line-based interface to the back end system, such as to a base station controller or mobile switching center that are part of the core network. In a bypass configuration, this interface carries selected data from the base station to its core network without processing the selected data by the onboard baseband unit. In this way, elements of the back end system (e.g., one or more baseband units) can perform the necessary processing instead of the onboard baseband unit of the integrated base station.

An aspect of the technology incorporates a switch at the integrated base station to bypass the on-board baseband processing and permit radio data (e.g., I and Q samples) to be forwarded directly via the fronthaul connection to the back end system for processing. In one example, the switch is a permanent switch, either physical or logical. In another example, the switch is a reversible switch that allows for implementation-specific bypassing depending on future enhancements to the network architecture.

Example Arrangement

Figure 1:
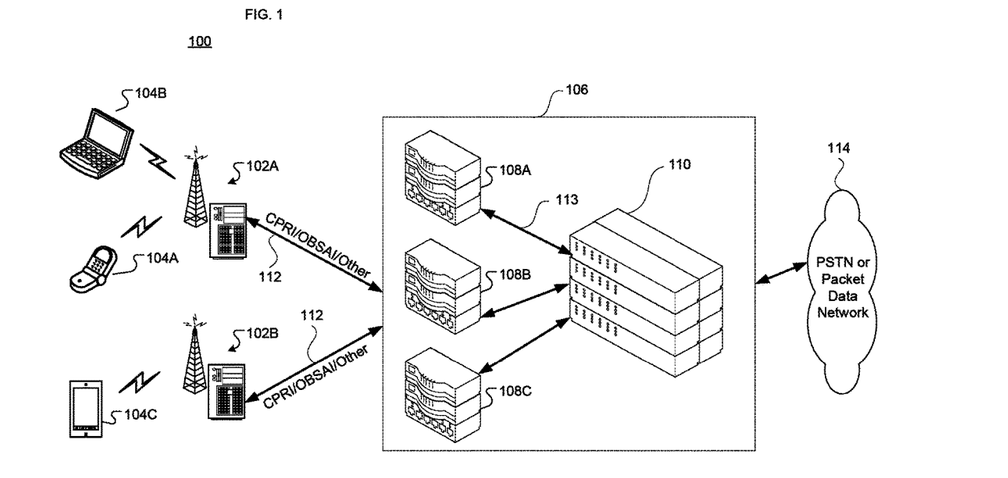
FIG. 1 illustrates an example wireless communications system according to aspects of the disclosure.

FIG. 1 illustrates an example wireless communication system 100. The system 100 of FIG. 1 includes one or more integrated (e.g., all-in-one) base stations 102. As shown, each base station, such as base stations 102A, 102B, etc., provides wireless connectivity to one or more client devices 104. Such devices may include, but are not limited to, mobile phones 104A, laptops or netbook PCs 104B, and PDAs 104C. The over-the-air interface between the client devices 102 and respective base stations 104 may comply with one or more wireless standards that incorporate, by way of example only, any or all of code division multiple access, (CDMA), time division multiple access (TDMA), and frequency division multiple access (FDMA). Examples of such standards include GSM, CDMA2000, Universal Mobile Telecommunications System (UMTS) and Long-Term Evolution (LTE). The architectures and implementations described herein are not limited to any particular wireless interface or protocol requirements.

Each integrated base station 102 is coupled to a back end system 106 by a link 112. Each link 112 may be an optical link, a copper wire link, a wireless link, etc. The connection links 112 to the back end system 106 employ a communication protocol for efficient transfer of data to support communication by the client devices. In one example, the communication protocol is the Common Protocol Radio Interface (CPRI). In another example, the communication protocol is the Open Base Station Architecture Initiative (OBSAI). In yet another example, the VME bus International Trade Association (VITA) 49 protocol may be use. And further examples may employ proprietary communication protocols.

The back end system 106 includes one or more baseband units 108. For instance, FIG. 1 illustrates baseband units 108A, 108B and 108C, although more or fewer baseband units may be provided as part of the back end system 106. The baseband units 108 are configured to process selected data received from the integrated base stations 102, as well as to handle data packets and connection-related data. For instance, the selected data may be radio data such as I and Q samples. Other types of radio data, as well as other information received by the base stations 102, may also be provided to the baseband units 108 for processing.

The respective baseband units 108 connect to other parts of the back end system 106 via backhaul connections 113. The backhaul connections 113 may include routers and switches (not shown). The other parts of the back end system to which the baseband units connect may include a mobility management entity (MME), a serving gateway (S-GW), and/or a packet data network gateway (P-GW), which may be referred to collectively as the core network 110. Other elements of the back end system 106, such as a home subscriber server, are not shown for simplicity. The back end system 106 is also coupled to one or more other networks 114, such as the PSTN or packet data networks including the Internet.

Figure 2:
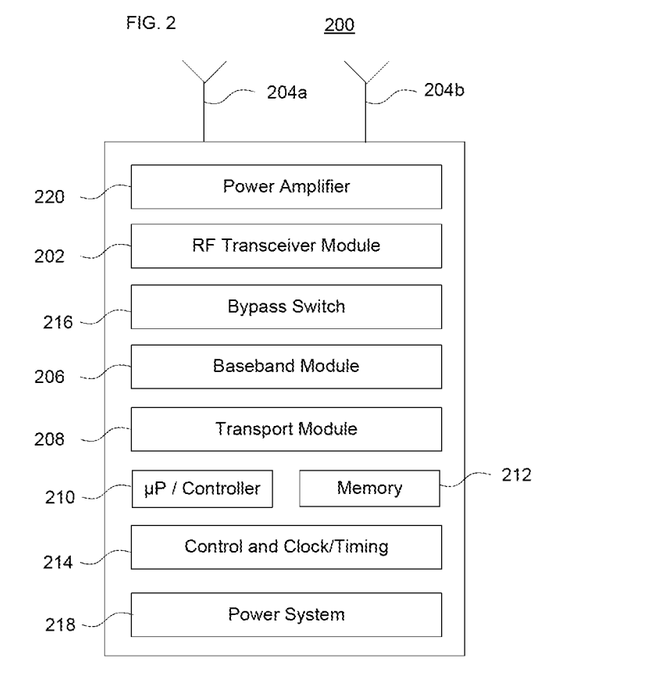
FIG. 2 illustrates an example all-in-one base station according to aspects of the disclosure.

Turning next to FIG. 2, this figure illustrates an example integrated base station 200 in accordance with aspects of the disclosure. As shown, the integrated base station includes an RF transceiver module 202 coupled to antennae 204a and 204b and to power amplifier 220. While only two antennae are shown, more or less than two may be used. For instance, multiple antennae may be arranged for a multiple input, multiple output (MIMO) configuration. Each antenna may be used for transmission, reception or both. The RF transceiver module 202 is configured to receive data from baseband module 206 and to process it for transmission as RF signals (e.g., data packets) in accordance with the applicable over-the-air interface. The RF transceiver module 202 is also configured to receive signals from the UEs/client devices and optionally from nearby neighboring base stations.

The baseband module 206 is configured to process data packets and other information prior to transmission by the RF transceiver module 202 via the one or more antennae 204, and also to process data packets and other information received by the RF transceiver module. This may include analyzing and processing radio data received from the RF transceiver module in accordance with whichever over-the-air interface is being employed. Such data, once processed by the baseband module, may be used when the system sends or receives future data packets and other information signals. For instance, processed I and Q radio data may be used to improve the performance of the RF transmissions.

The baseband module 206 is also coupled to transport module 208. The transport module 208 provides a communications interconnect between the integrated base station and the back end system 106 via the link 112 shown in FIG. 1. Link 112 may be a fiber, copper-based, or wireless connection to and from the back end system. In one example, the transport module provides an Ethernet-type connection to the back end system in accordance with the selected communication protocol. The transport module may comprise a field-programmable gate array (FPGA).

The integrated base station also includes a microprocessor or controller (e.g., processor) 210 and memory 212. Memory 212 stores information accessible by processor 210, including instructions that may be executed by the processor and data that may be retrieved, manipulated or stored by the processor. The memory may be of any type capable of storing information accessible by the processor, such as a hard-drive, ROM, RAM, CD-ROM, flash memories, writecapable or read-only memories. The processor may be a microprocessor. Alternatively, the processor may be a dedicated controller for executing operations, such as an ASIC. In one scenario, the processor is a stand-alone processor manages the overall operation of the integrated base station. In another scenario, the processor is part of the baseband module. In yet another scenario, the processor is part of the RF transceiver module.

While only one processor 210 and one memory 212 are shown, the processor and memory may actually comprise multiple processors and memories that may or may not be stored within the same physical housing or location. For example, some or all of the instructions and data may be stored on a removable storage medium (e.g., optical drive or USB drive) and others within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories such as hard drives or the like.

The instructions may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The functions, methods and routines of instructions in accordance with the present disclosure are explained in more detail below.

FIG. 2 also shows a control and clock/timing module 214. This module may be separate from or part of the processor 210. The clock or timing may be used by the system to synchronize communication with the UEs, neighboring base stations and/or other parts of the wireless communication network.

Bypass switch 216 is operatively coupled to at least the RF transceiver module 202 and to the transport module 208. Depending on the mode of operation, the bypass switch may be active or inactive. In the inactive state, the baseband module operates to pass data and other information to and from the RF transceiver module. In the active state, the bypass switch acts as a bridge between the RF transceiver module and the transport module, so that certain data is passed to the back end system for processing there instead of in the baseband module. These modes of operation are discussed further below.

Power system 218 provides power to the components of the integrated base station 200. The power system may include components such as a voltage converter. The power system may also include a backup power generator.

The components shown in FIG. 2 may be physically and/or logically interconnected in accordance with the above description.

Example Methods and Use Cases

As noted above, features of the technology can be implemented in different use cases or modes of operation. Examples of operational modes are discussed below and with reference to the accompanying figures.

Figure 3A:
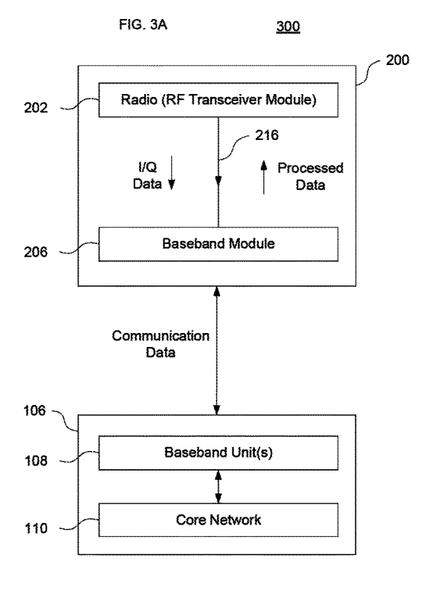
FIGS. 3A-B illustrate aspects of a base station and back end network in accordance with aspects of the disclosure.
Figure 4A:
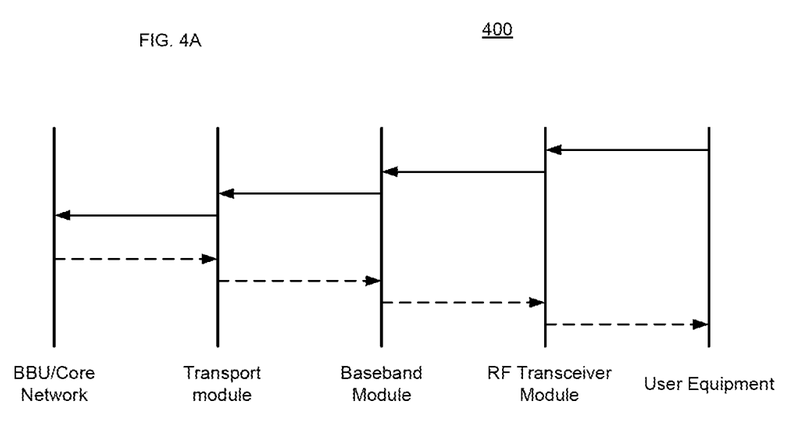
FIG. 4A illustrates a first operation mode in accordance with aspects of the disclosure.

In a first operation mode, the baseband module of the integrated base station analyzes and processes data, and forwards the processed data to the RF transceiver module for use in subsequent data packet transmissions to client devices. In this case, the baseband module also receives radio data and data packets from the RF transceiver module. FIGS. 3A and 4A show examples of this operation mode.

FIG. 3A illustrates that the bypass switch 216 is not active. In this situation, selected data such as radio I/Q data is provided to the baseband module for processing within the base station. Resultant processed data is returned to the RF transceiver module from the on-board baseband module. Communication data is exchanged with the back end system, but the selected data is handled internally in the base station.

FIG. 4A illustrates how certain data flows through the base station to the back end system including the baseband units and core network. Here, as illustrated by the solid arrows, uplink signals are received from the user equipment by the RF transceiver module in accordance with the air interface protocol. The RF transceiver module downconverts the received uplink signals to baseband signals and passes that information to the baseband module. The RF transceiver may also provide certain gathered or computed radio data to the baseband module. The baseband module parses out data communication packets to be sent to the PSTN or other network and passes that information to the transport module. In turn, the transport module sends the information to the back end system via the connection link as described above.

As noted above, in this scenario certain data is not passed from the baseband module to the back end system. For instance, selected radio data, such as I and Q samples, is processed locally by the baseband module within the integrated base station, as shown by FIG. 3A. The processed data may be used to modify or otherwise enhance operation of the RF transceiver module.

Similarly, when communicating with the user equipment, the process may operate substantially in reverse. Thus, as shown by the dashed arrows in FIG. 4A, downlink traffic (e.g., data packets) destined for a wireless client device is provided by the back end system to the transport module. The transport module passes the traffic to the baseband module, which supplies it to the RF transceiver module. The RF transceiver module upconverts the downlink traffic in accordance with the air interface and transmits it via one or more of the antennae to the user equipment.

As noted above, upgrades to the system may be performed. In some instances, this may involve a firmware change. Here, it may be relatively quick and inexpensive to upgrade the firmware of the baseband module or other components of the integrated base station. However, other upgrades may require replacement of hardware elements, for instance to accommodate a new wireless standard or to handle feature updates. These upgrades may impact the baseband processing of the integrated base station. For instance, the on-board baseband module may not be capable of performing the functions supported by the upgrade. While the baseband module or the entire integrated base station could be replaced, this can be a costly and time consuming process for a network provider. Thus, in accordance with aspects of the technology, bypass switch 216 is employed to circumvent processing of selected data by the on-board baseband module and to pass that data to the back end system for processing off-site.

Figure 3B:
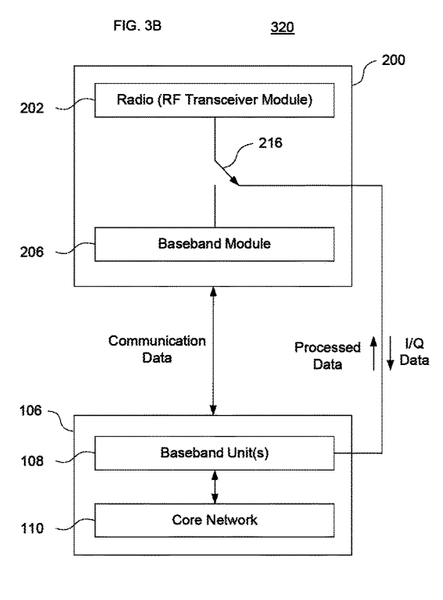
Figure 4B:
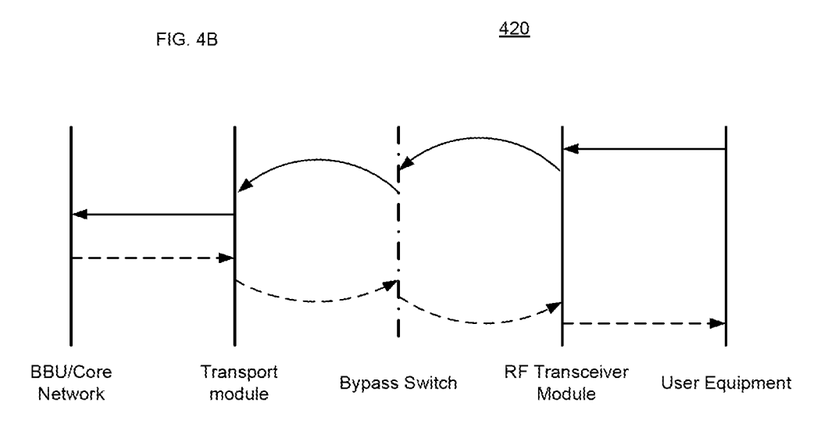
FIG. 4B illustrates a second operation mode in accordance with aspects of the disclosure.

FIGS. 3B and 4B illustrates a second (bypass) operation mode. FIG. 3B indicates that in this mode the bypass switch 216 is active. In this situation, selected data such as radio I/Q data is not provided to the onboard baseband module for processing within the base station. Rather, this data is routed around the baseband module and to the back end system, for instance to a baseband unit. The baseband unit or other network element performs the necessary processing. Resultant processed data is returned to the RF transceiver module from the back end system. Communication data is exchanged between the integrated base station and the back end system in the same manner as in the first operation mode.

As shown in FIG. 4B, similar to the initial stage in the first operation mode, as illustrated by the solid arrows uplink signals are received from the user equipment by the RF transceiver module in accordance with the air interface protocol. However, here the RF transceiver module downconverts the received uplink signals to baseband signals and passes that information via the bypass switch to the transport module. In turn, the transport module sends the information to the back end system via the connection link as described above.

Similarly, when communicating with the user equipment, the process may operate substantially in reverse. Thus, as shown by the dashed arrows in FIG. 4, downlink traffic destined for a wireless client device is provided by the back end system to the transport module. The transport module passes the traffic through the bypass switch to the RF transceiver module. The RF transceiver module upconverts the downlink traffic and transmits it via one or more of the antennae to the user equipment.

In the bypass mode, selected data would come from the RF transceiver module via bypass switch to the back end system, skipping handling by the on-board baseband module. The baseband processing of such data, e.g., I and Q radio data, would then be performed at a different network element, located somewhere other than the integrated base station. The processed data would be returned to the base station, for instance as shown by the examples of FIGS. 3B and 4B.

In one scenario, the selected unprocessed data is provided to one or more baseband units, such as baseband units 108 of FIG. 1. According to one example, there may be a one to one pairing so that data from a given integrated base station is provided to a particular baseband unit 108. In another example, data from multiple base stations may be provided to a single baseband unit 108. In a further example, there may be scaling limits on the backend in terms of how many (baseband) signals from different integrated base stations can be amalgamated in a particular backend server. Thus, in one configuration multiple backend servers could be employed to handle the traffic for one or more integrated base stations. The baseband units or other back end devices, such as the core network, may be selected to process certain kinds of data or data from specific base stations so that they provide the quickest or most expedient processing of such data. Alternatively, in the event that some integrated base stations have already been upgraded with the enhanced feature, the selected data may be routed to an upgraded base station for baseband processing.

In one example, the decision on whether to bypass the on-board baseband module is initiated from the back end system via the connection to the integrated base station. In another example, the bypass decision is made at the integrated base station itself, for instance by processor 210. In either case, the decision may be triggered in accordance with the specific type of data to be processed, whether a new feature is to be supported, due to a change in the communication protocol, etc.

The switch operation may include reconfiguring the FPGA or other device within the base station handling the Ethernet connection with the backend to now (also) communicate via CPRI (or OBSAI or VITA-49 or a proprietary communication protocol). The reconfiguration would cause the selected data to not be processed by the on-board baseband unit, and instead be processed by components at the back end system as described above. The bypass switch may be either a physical switch or a logical switch. The switch operation can involve a permanent change in how the integrated base station operates. Alternatively, the switch operation can be a temporary or reversible feature depending on future enhancements to the integrated base station. For instance, in the latter case, a flag or other indicator may indicate to the processor of the integrated base station whether the bypass switch should be enabled.

When the bypass switch is active, the selected data could be routed to pass through the baseband module without any processing. Or the selected data could split off at the RF transceiver module so that it does not pass through the baseband module at all. Alternatively, the selected data could be rerouted to the back end system at the MAC layer or at some other point in the protocol stack. In this scenario, only a portion of the baseband functionality is bypassed and thus some of the baseband processing is still done in the base station while the remaining processing is performed by the back end system. How the selected data is routed to the back end system without processing by the baseband module may depend on the specific type of data, any timing constraints on how quickly the data must be processed, etc.

Figure 5:
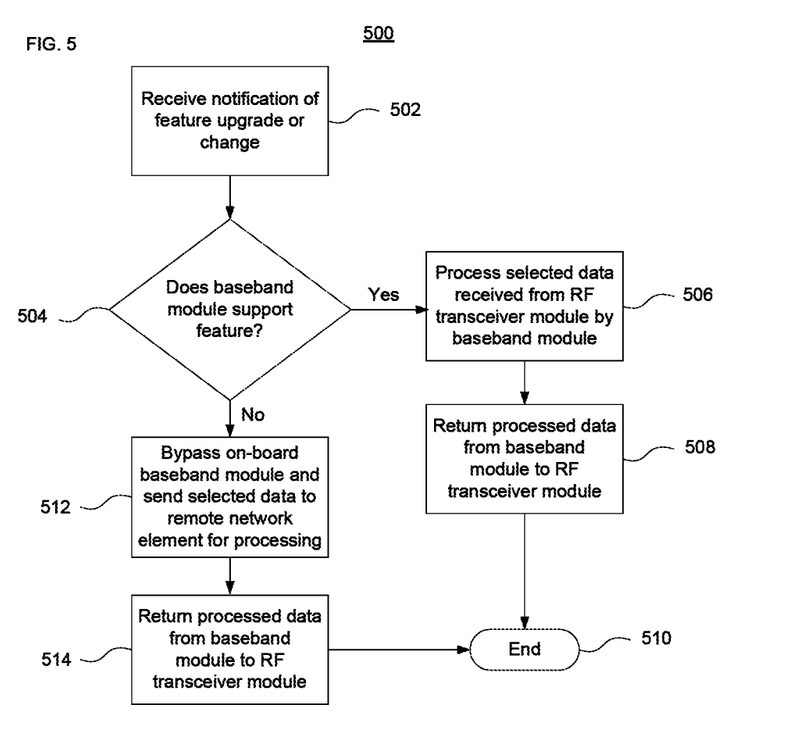
FIG. 5 illustrates a baseband bypass process in accordance with aspects of the disclosure.

FIG. 5 is a flow diagram illustrating aspects of the bypass process. At block 502, the system receives notification of a feature upgrade or change. This notification may indicate which baseband modules are able to support the particular feature. The notification may be provided to the integrated base station, to baseband units of the back end system, and/or to other components of the wireless communication network.

At block 504, a compatibility check is performed to determine whether the baseband module of the integrated base station supports the feature. If so, the process proceeds to block 506. Here, the selected data such as I and Q radio data is processed by the baseband module within the integrated base station. Then at block 508, the processed data is provided to the RF transceiver module for use with subsequent wireless communication with the remote client devices, with other base stations and/or with other wireless network elements. From here, the process ends at block 510.

When the compatibility check results in a determination that the baseband module is not able to support the feature, the process proceeds to block 512. Here, the bypass switch at the base station is employed to route the selected data to the back end system for baseband processing as described above. Then at block 514 the processed data is provided to the RF transceiver module for subsequent use. From here the process ends at block 510.

As explained above, the bypass switch may be permanently enabled, in which case there would be no need to repeat the processes at blocks 502 and 504. However, for the situation where the bypass switch is temporarily or selectively enabled, the processes at blocks 502 and 504 may be repeated as needed.

The logic and process flows depicted in the figures and described herein are not limited to a particular order or sequence unless expressly stated. In addition, other steps may be provided, or steps may be eliminated, from the described flows, and other components may be added to, or removed from, the described systems.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An integrated base station, comprising:
a radio transceiver subsystem operative to communicate with one or more wireless devices in a wireless communication network, the radio transceiver subsystem including:
one or more antennae; and
a power amplifier;
a baseband subsystem operatively coupled to the radio transceiver subsystem, the baseband subsystem including one or more processors configured to process uplink communication data and radio data received from the radio transceiver subsystem, to provide the processed uplink communication data to processors of one or more baseband units of the wireless communication network, and to provide the processed radio data to the radio transceiver subsystem;
a transport module operatively coupled to the baseband subsystem and to the radio transceiver subsystem, the transport module including a communications interconnection device configured to exchange information with the one or more baseband units; and
a switch operatively coupled to the radio transceiver subsystem, the baseband subsystem and the transport module, the switch being configured to bypass processing of selected portions of the radio data by the baseband subsystem and to transmit the selected portions of the radio data to the one or more baseband units for processing via the transport module.

2. The integrated base station of claim 1, wherein the switch is arranged to bypass the processing by the baseband subsystem in response to a bypass decision received from the wireless communication network.

3. The integrated base station of claim 2, wherein, upon activation the switch permanently bypasses processing of the selected portions of the radio data by the baseband subsystem.

4. The integrated base station of claim 2, wherein:
the communications interconnection device of the transport module includes a field-programmable gate array configured with an Ethernet connection to the one or more baseband units; and
upon receipt of the bypass decision, the field-programmable gate array is reconfigured to communicate the selected portions of the radio data to the one or more base band units according to a predetermined protocol.

5. The integrated base station of claim 4, wherein the predetermined protocol is selected from among the group consisting of CPRI, OBSAI and VITA-49.

6. The integrated base station of claim 4, wherein the predetermined protocol is a proprietary protocol.

7. The integrated base station of claim 1, wherein the selected portions of the radio data include I and Q samples obtained by the radio transceiver subsystem.

8. The integrated base station of claim 1, wherein, in response to passing the selected portions of the radio data to the one or more baseband units, the communication interconnection device of the transport module is configured to receive processed radio data from the one or more baseband units and to provide the received processed radio data to the radio transceiver subsystem via the switch, for use during subsequent wireless transmissions.

9. The integrated base station of claim 1, wherein the switch is a programmable switch.

10. A computer-implemented method for baseband bypass in an integrated base station of a wireless communication network, the method comprising:
receiving, by one or more processors, notification of a feature modification in the wireless communication network;
determining, by one or more processors, whether the feature modification is supported by a baseband module of the integrated base station;
upon determining that the feature modification is not supported by the baseband module of the integrated base station, activating a bypass switch in the integrated base station to route selected data from a radio transceiver subsystem of the base station to back end system element of the wireless communication network for baseband processing of the selected data; and
providing the baseband processed selected data to the radio transceiver subsystem via the bypass switch.

11. The method of claim 10, wherein the bypass switch routes the selected data from the radio transceiver subsystem to a transport module of the integrated base station without passing the selected data through the baseband module of the integrated base station.

12. The method of claim 11, wherein the baseband processed selected data is received by the transport module and is routed by the bypass switch to the radio transceiver subsystem without passing through the baseband module.

13. The method of claim 10, further comprising determining whether to disable the bypass switch so that the baseband module processes subsequent selected data received from the radio transceiver subsystem.

14. The method of claim 10, wherein the determining whether the feature modification is supported by the baseband module of the integrated base station is performed by the back end system element.

15. The method of claim 10, wherein the determining whether the feature modification is supported by baseband module of the integrated base station is performed by the integrated base station.

16. A wireless network system comprising:
a back end system including one or more baseband units;
an integrated base station including:
a radio transceiver subsystem operative to communicate with one or more wireless devices in a wireless communication network, the radio transceiver subsystem including:
one or more antennae, and
a power amplifier;
a baseband subsystem operatively coupled to the radio transceiver subsystem, the baseband subsystem including one or more processors configured to process uplink communication data and radio data received from the radio transceiver subsystem, to provide the processed uplink communication data to processors of one or more baseband units of the wireless communication network, and to provide the processed radio data to the radio transceiver subsystem;
a transport module operatively coupled to the baseband subsystem and to the radio transceiver subsystem, the transport module including a communications interconnection device configured to exchange information with the one or more baseband units; and a switch operatively coupled to the radio transceiver subsystem, the baseband subsystem and the transport module, the switch being configured to bypass processing of selected portions of the radio data by the baseband subsystem and to transmit the selected portions of the radio data to the one or more baseband units for processing via the transport module; and one or more links operatively coupling the integrated base station to the one or more baseband units.

17. The wireless network system of claim 16, wherein the switch is arranged to bypass the processing by the baseband subsystem in response to a bypass decision received via a given one of the one or more links.

18. The wireless network system of claim 17, wherein, upon activation the switch permanently bypasses processing of the selected portions of the radio data by the baseband subsystem.

19. The wireless network system of claim 16, wherein the selected portions of the radio data include I and Q samples obtained by the radio transceiver subsystem.

20. The wireless network system of claim 16, wherein the communications interconnection device of the transport module is configured to receive processed radio data from the one or more baseband units and to provide the received processed radio data to the radio transceiver subsystem for subsequent use during transmissions with the one or more wireless devices.

* * * * *